United States Patent [19]

Zappe

[11] Patent Number: 4,951,412
[45] Date of Patent: Aug. 28, 1990

[54] FISH CATCHING DEVICE

[75] Inventor: Richard P. Zappe, Fort Walton Beach, Fla.

[73] Assignee: Zappe, Inc., Fort Walton Beach, Fla.

[21] Appl. No.: 356,720

[22] Filed: May 24, 1989

[51] Int. Cl.$^5$ ............................................. A01K 83/02
[52] U.S. Cl. ............................................. 43/37; 43/34
[58] Field of Search .......................... 43/34, 35, 36, 37

[56] References Cited

U.S. PATENT DOCUMENTS

| 1,507,344 | 9/1924 | Dolring | 43/34 |
| 2,648,927 | 8/1953 | Berry | 43/37 |
| 2,747,412 | 5/1956 | Hanks | 43/34 |

FOREIGN PATENT DOCUMENTS

| 118883 | 9/1944 | Australia | 43/34 |
| 17725 | of 1881 | Fed. Rep. of Germany | 43/34 |
| 358865 | 3/1906 | France | 43/34 |

Primary Examiner—Kurt Rowan
Attorney, Agent, or Firm—Saliwanchik & Saliwanchik

[57] ABSTRACT

The subject invention is a novel device for catching fish. This device reduces the possibility of a fish stealing bait, and it securely holds a fish once a fish has been initially hooked. Advantageously, the novel device is effective whether or not the fishing line is being attended at the moment a fish is caught.

1 Claim, 3 Drawing Sheets

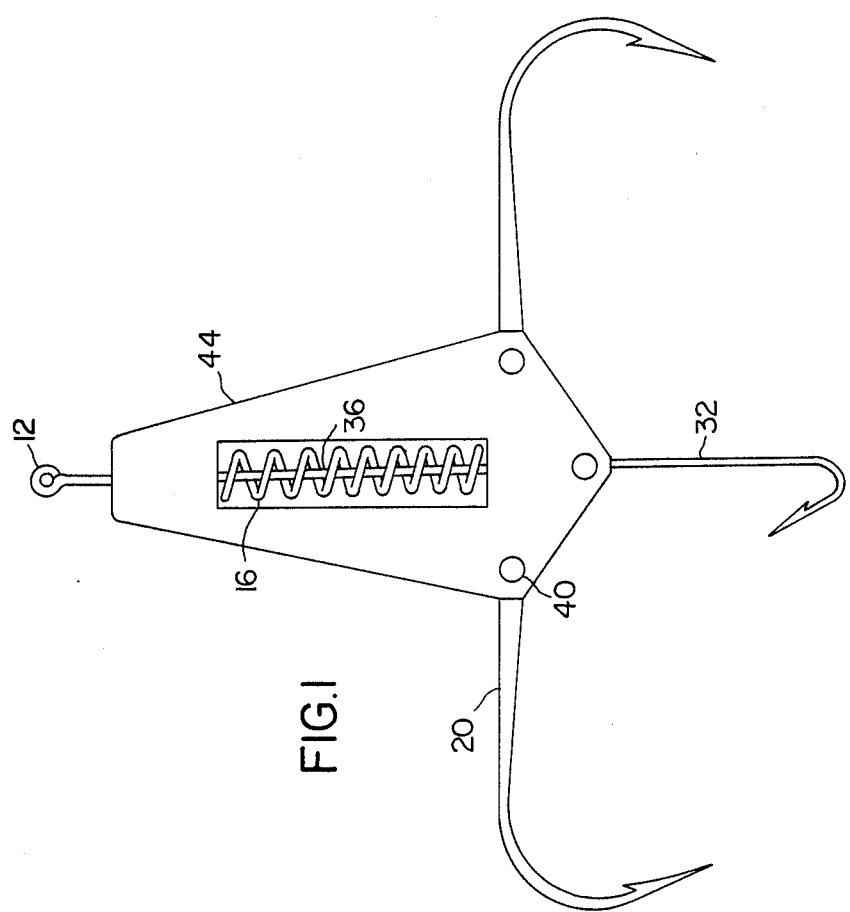

FISH CATCHING DEVICE

CROSS-REFERENCE TO A RELATED APPLICATION

The invention described herein is the subject of a co-pending design patent application, Ser. No. 206,161.

BACKGROUND OF THE INVENTION

A problem that has existed ever since man has been trying to catch fish with baited hooks involves the difficulty of getting a fish securely onto the hook. A related problem involves keeping a fish from throwing the hook out of its mouth once it has become initially hooked. Of course, there are many ways of attaching bait to a hook so that it is difficult for a fish to simply steal the bait without becoming hooked. Also, hooks are now designed to prevent a fish from either stealing the bait or from throwing the hook out of its mouth. For example, most modern hooks have barbs on them to prevent both the easy removal of bait from the hook and slippage of the hook from the fish once a fish has been hooked.

As anyone who has done much fishing knows, hook design and methods of attaching bait only go so far in preventing fish from escaping with the bait without being caught. The experienced fisherman may have an advantage in keeping the fish on the hook by being able to set the hook with a rapid pull once a tag at the bait is felt. Unfortunately, this technique is only moderately successful, even when practiced by experienced anglers because it may result in the hook actually being pulled from the mouth of the fish before becoming lodged within the mouth or jaw. Also, many fish are simply too quick and can steal the bait long before the fisherman has a chance to set the hook properly.

Another impediment to effectively setting the hook in a fish's mouth may be the shape and characteristics of that fish's mouth and jaw area; for example, the infamous sheepshead has a protruding mouth and jaw structure such that it is able to easily nibble bait from a hook without actually having the hook enter its mouth or without the fisherman even being able to feel the nibble adequately to try and set the hook.

Additionally, there are many methods of fishing, and some of these methods do not enable the fisherman to give constant attention to the line. Therefore, even if a bite on the line would have been immediately evident to a fisherman holding that line, the fish will have a very good chance of stealing the bait from the unattended line. This situation can occur, for example, if the fisherman is using multiple lines, if he is trolling for fish, or in the case of certain apparatuses which are used when a fisherman wishes to fish without actually being present to hold the line. An example of an apparatus used in this manner is the familiar ice-fishing rig; a fisherman often uses many such rigs at one time and then merely watches to observe a signal which is set off once a fish is actually captured.

To help solve this age-old problem of getting and keeping a fish on a hook, the subject invention concerns a novel device which can augment the effect of a hook in securing a fish. This device will have its beneficial effects whether or not the fisherman is actually attending the line at the time a fish is caught. The inventor knows of no device which is similar to that which is claimed here.

BRIEF SUMMARY OF THE INVENTION

The subject invention concerns a novel fish catching device with enhanced capability for catching and keeping fish on the hook. The fish-catching device of the subject invention comprises a central hook or other baiting device which can be, for example, similar to any fish hook currently available; said fish-catching device further comprises retractable tines which, when in their retracted position, are spring-loaded such that a pull or tug on the main hook structure causes said tines to release or move forward rapidly, thus striking and catching the fish which has caused the tug on the main hook. To be effective, the tines may be retractable such that they do not interfere with the fish's access and desire to approach the central baiting device. Furthermore, the tines should be designed such that they release rapidly and strike, or come together, at a point near the baiting device such that any fish at or around the bait will be caught by the releasing tines.

BRIEF DESCRIPTION OF THE DRAWINGS

FIG. 1 is a front elevational view of the fish catching device showing the central baiting device, two tines, and other unique features.

FIG. 2 is a side elevational view of the novel fish catching device.

FIG. 3 is an end elevational view of the novel fish catching device.

DETAILED DESCRIPTION OF THE INVENTION

Figure 4:
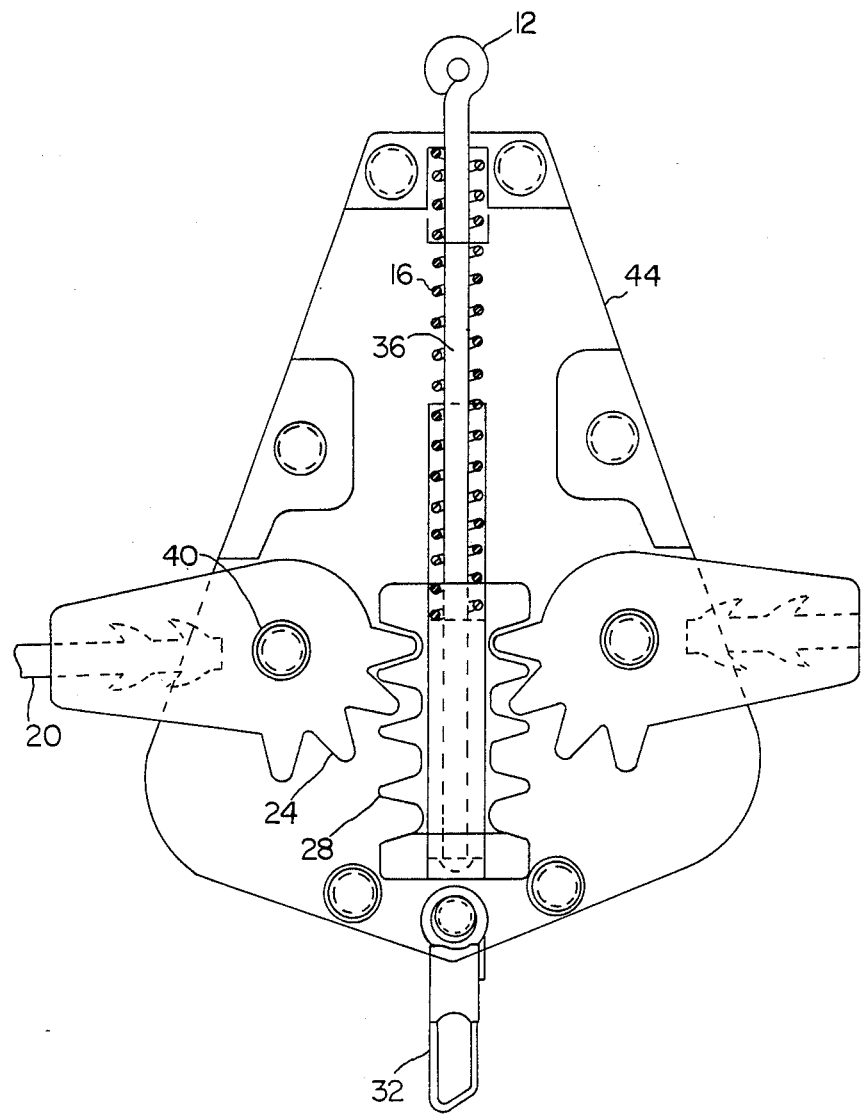
FIG. 4 is a front view of one specific embodiment of the novel fish catching device.
Figure 5:
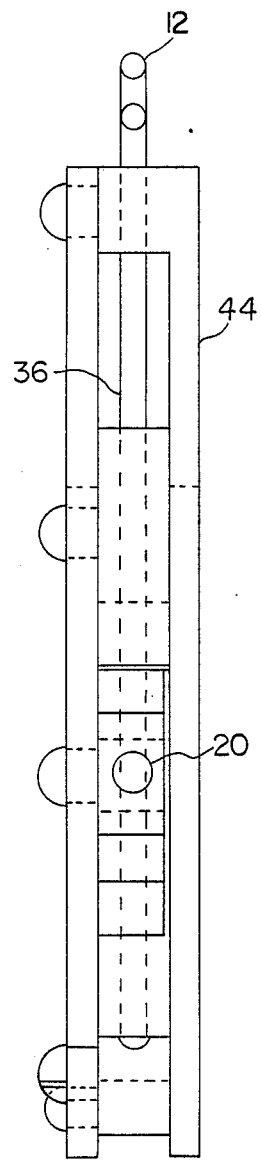
FIG. 5 is a side view of one specific embodiment of the novel fish catching device.

The novel fish-catching device of the subject invention may consist of a central hook or baiting device together with attached, retractable, and releasable tines. FIGS. 1 through 3 show several views of the general design of the novel fish catching device.

The tines of the subject invention are held in a retracted and/or cocked position until a fish tugs on the principal central baiting device, thus triggering a mechanism which releases the retracted tines, and/or causes them to spring forward abruptly, thus hooking into the fish which has triggered the device. As used here, the work "tine" refers to any mechanism with a sharpened point which can puncture and/or securely hold a fish. These tines might also be referred to as prongs, tongs, or auxiliary hooks.

The central baiting device of the subject invention can be any device which is capable of holding bait which would attract fish. The bait may either be live, or a lure, or any means by which fish can be attracted. For example, a great variety of baits such as worms, frogs, shrimp, and fish could be attached to a principal hook and thus used to attract fish. Also, the principal baiting device does not actually have to utilize a hook at all; it can simply be an artificial frog, eel, shrimp, fish, or other means to attract a fish. There is a tremendous variety of fish hooks available on the market now, of various shapes and sizes depending upon the type of fish and the conditions under which the hook will be used. Any of these hooks may be used as the central, primary hook of the subject invention. This central primary hook or baiting device must be situated such that the tines can be released or caused to move forward rapidly when the central baiting device is tugged upon.

In one embodiment of the invention, the principal baiting device enters into a casing where a mechanism exists for translating the tug on said baiting device into a releasing means for the spring-loaded tines. One end of each of said tines also enters into said casing. The casing and internal mechanisms and gears may be made out of any material which is moderately strong and non-corrosive. For example, these items may be made out of plastic or stainless steel. The principal hook and tines may be made out of any material which is commonly used for fish hooks, for example, stainless steel. As noted above, the principal baiting device may also simply consist of an artificial food item which would attract a fish.

In another embodiment, the tines may be retracted but not spring-loaded. In this embodiment, the tug on the hook or fishing line causes the tines to rapidly move forward to strike the fish.

The fish-catching device of the subject invention may be modified to catch fish of all different shapes and sizes. For example, the manner and geometry of how the tines are attached to the casing and how they spring forth can be adjusted so that they will strike the anticipated fish in an advantageous location.

The number of tines used can also vary according to the anticipated application of the device. Typically, from one to four tines will be used in order to provide adequate means for securing the fish, but without making the device unwieldy. Although specific mens for cocking and releasing the tines is exemplified herein, any means by which the tines can be first moved back away from the principal hook and then moved forward rapidly in order to secure the fish could be utilized.

Following is an example which illustrates procedures, including the best mode, for practicing the invention. This example should not be construed as limiting.

EXAMPLE 1

One specific embodiment of the subject invention is shown in FIG. 4, in this embodiment, a fishing line is attached to the novel fish catching device at a loop 12. Said loop is attached, or is formed, at one end of a rod 36 which essentially serves to connect the loop 12 and, hence, the fishing line, to a gear assembly 28 which is attached to the end of the rod 36. Said gear assembly 28 engages with a second gear assembly 24 which is attached to one end of the tines 20. Said second gear assembly 24 and attached tines 20 pivot about a stationary point 40. The stationary point 40 may be a bolt or peg which serves to anchor the tines 20 and gear assembly 24 as well as hold together two sides of the casing 44. Attached to said casing is a principal baiting device or suitable loop or other location to which bait or a hook can be attached 32.

The rod 36 and the attached gears 28 are free to move up and down within said casing 44. As the rod 36 moves from its initial rest position, the loop 12 moves out away from the casing 44. This upward movement of the rod 36 causes a spring 16 which surrounds the rod to become compressed. Clearly, therefore, a force is required to make the rod 36 and loop 12 move relative to the casing 44 and baiting device 32. This force can be supplied by a tug on the fishing line if the bait is held steady by a fish; or this force could be supplied by a fish tugging on the bait if the line is held steady. When the rod 36 moves upward relative to the casing 44 and hook attachment 32, then the first gear assembly 28 engages with the second gear assembly 24, causing the second gear assembly and the attached tines 20 to rotate about the pivot point 40. The tines rotate downward toward the hook attachment area. When a force is not exerted, or when the force is removed, the tension of the spring 16 keeps the rod 36 extended inside the casing 44 and, consequently, the tines remain extended essentially perpendicular to the rod 36 and the hook attachment 32.

Advantageously, the device described here causes the tines to move forward rapidly when a fish grabs the bait. The stronger the tug on the bait, the faster and more forcefully the tines will move forward. Ideally, the device is activated when the angler feels the fish and firmly raises the rod tip to ensure the full functioning of the tines. However, the device can also be activated by the tug of the fish alone. The device can greatly reduce the chances of a fish getting away.

It should be understood that the example and embodiments described herein are for illustrative purposes only and that various modifications or changes in light thereof will be suggested to persons skilled in the art and are to be included within the spirit and purview of this application and the scope of the appended claims.

I claim:

1. A fish catching device comprising a first loop for attaching a fishing line, said device further comprising a casing to which is attached a second loop where a hook or bait may be attached, said first and second loops being at opposite ends of said fish catching device;

said first loop being connected to, or part of, a rod which enters into said casing; said rod being free to move up and down in said casing when a force relative to said casing is applied to said fishing line; said rod being surrounded by a spring which keeps said rod extended within the casing when no force is applied to said fishing line relative to said casing; at one end of said rod is a first gear assembly which is capable of meshing with a second gear assembly; said fish catching device further comprising one or more tines which pivot about a stationary point(s), said stationary point(s) being located within said casing; connected to each of said tines and also pivoting about said stationary point(s) is said second gear assembly; said second gear assembly meshes with said first gear assembly such that movement of said rod causes said first and second gear assemblies to engage; the tines and pivot point of said fish catching device are positioned such that the engagement of said first and second gear assemblies causes the tines to rotate about said pivot point such that the end of said tines approach the proximity of said second loop.

* * * * *